(12) United States Patent
Chen et al.

(10) Patent No.: US 8,775,356 B1
(45) Date of Patent: Jul. 8, 2014

(54) QUERY ENHANCEMENT OF SEMANTIC WIKI FOR IMPROVED SEARCHING OF UNSTRUCTURED DATA

(75) Inventors: Jidong Chen, Beijing (CN); Jun Li, Beijing (CN)

(73) Assignee: EMC Corporation, Hopkinton, MA (US)

( * ) Notice: Subject to any disclaimer, the term of this patent is extended or adjusted under 35 U.S.C. 154(b) by 597 days.

(21) Appl. No.: 13/081,009

(22) Filed: Apr. 6, 2011

(51) Int. Cl.
*G06F 17/00* (2006.01)
*G06N 5/02* (2006.01)

(52) U.S. Cl.
USPC .................. 706/50; 707/1; 707/803; 707/2

(58) Field of Classification Search
CPC .......... G06N 5/02; G06N 5/022; G06N 5/04; G06F 17/30654; G06F 17/273; G06F 17/30587; G06F 17/30905; G06F 17/2785; G06F 17/30675; G06F 17/30734
See application file for complete search history.

(56) References Cited

U.S. PATENT DOCUMENTS

2008/0040308 A1* 2/2008 Ranganathan et al. ........... 707/1
2009/0248619 A1* 10/2009 Das et al. ......................... 707/2

OTHER PUBLICATIONS

IkeWiki: A SemanticWiki for Collaborative Knowledge Management; Sebastian Schaffert Salzburg Research Forschungsgesellschaft/Salzburg New Media Lab Jakob Haringer Str. 5/II, A-5020 Salzburg, Austria Proceedings of the 15th IEEE International Workshops on Enabling Technologies:Infrastructure for Collaborative Enterprise (WETICE'06) 0-7695-2623-3/06 $20.00 © 2006.*

* cited by examiner

*Primary Examiner* — Kakali Chaki
*Assistant Examiner* — Luis Sitiriche
(74) *Attorney, Agent, or Firm* — Barry N. Young

(57) ABSTRACT

Enhanced querying of unstructured data in enterprise knowledge base for improved collaboration and management of content is obtained by implementing the knowledge base using Semantic Wiki technology to afford semantic querying capability, and by annotating data in the knowledge base with reasoning supports that infer relations between different data using special properties that define transitive, symmetric and inverse of relations between data.

15 Claims, 2 Drawing Sheets

QUERY ENHANCEMENT OF SEMANTIC WIKI FOR IMPROVED SEARCHING OF UNSTRUCTURED DATA

BACKGROUND

This invention relates generally to accessing an unstructured knowledge base, and more particularly to improving the query and searching capability for accessing content in an unstructured enterprise knowledge base.

Wikis are simple web tools that enable users to collaboratively author content in a browser. They facilitate collecting and sharing knowledge in communities and enterprises, and their flexibility is ideal for managing content and processes that change frequently. However, this knowledge is unstructured and mostly contained in data entities within Wiki pages that are linked by title. Conventional Wiki systems do not enable knowledge reuse, and have only limited support for finding content. These limitations result from a lack of structure in the Wiki content. Almost all information is written in natural language which has little machine understandable semantics. For example, a page about the author John Grisham may contain a link to the page about his novel "The Pelican Brief". The text may say that John Grisham wrote the Pelican Brief, but that information is not machine-understandable, and, therefore, cannot be used for querying, navigating, translating, or aggregating any information. More specifically, the existing Wiki systems do not offer structured access for browsing or searching information. Users cannot currently directly query a Wiki system for desired information, because the information content is unstructured. For example, users looking for "How old is John Grisham?", "Who wrote the Pelican Brief?", or "Which European authors have won the Nobel prize for literature?" cannot query the Wiki to ask these questions directly. Instead, they have to navigate to pages that contain the desired information and read it themselves. For more complicated queries that require some background knowledge, users need to manually combine the knowledge from several sources.

While Wiki allows users to easily make links from one page to other pages, these links can only be used to navigate to referenced pages. In fact, these explicit links are actually the only means of navigation. If no explicit connection is made between two related pages, e.g. between two authors that have the same publishing company, then no navigation will be possible between those pages, and there is no way to structure a query to locate the information directly.

Semantic Wiki was developed to extend conventional Wiki with "semantic technologies" like RDF and OWL to add more structure and facilitate structured queries and greater access to the knowledge content. This was done by giving users the ability to annotate existing navigational links with symbols that describe their meaning. Most annotations are mapped to simple OWL statements, similar to RDF triples. Annotations may add property and value information to pages. Properties are used to express binary relationships between one semantic entity (as represented by a Wiki page) and another such entity or data value. There are different kinds of values, such as other pages, strings, dates, locations, etc. While a regular Wiki enables users to make formal descriptions of resources using annotations in natural language, Semantic Wiki enables users to additionally describe resources in a formal language. Using the formal structured annotations of resources, Semantic Wiki allows a "semantic search" on the underlying knowledge base using queries expressed in a query language such as SPARQL which was proposed as a W3C recommendation for RDF querying. Users can search for information using structured queries, in addition to a simple full-text search, and can query the annotations directly or create views from such queries. Users can also find related information through associative browsing. The Wiki analyzes the semantic relations in the data and provides navigational links to related information.

Semantic Wiki annotations have advantages over regular Wiki solutions in that they also provide more information for better navigation between pages. Whereas a traditional Wiki can only follow a link, Semantic Wiki annotations offer additional information about the relation that the link describes, and this information can be used to afford additional or more sophisticated navigation. Semantic Wiki allows links to be annotated by giving them certain "types". The idea behind this is that a link created by a user almost always carries meaning beyond mere navigation. Additionally, Semantic Wiki can change the way content is presented based on the semantic annotations. This can include enriching pages by displaying of semantically related pages, displaying of information that can be derived from the underlying knowledge, or even rendering the content of a page in a different manner that is more suitable for the context.

Although Semantic Wiki has greatly enhanced the ability to find and retrieve information from Wlki content, Semantic Wiki still requires using queries that syntactically and literally match annotations in the content to locate a page containing the information. It suffers from the inability to search for and locate content using structured queries that can be parsed to search the content based upon the intent of the user. Also, Semantic Wiki is unable to deduce facts that were not entered directly or to draw inferences automatically to locate information that was not literally requested. As a result, Semantic Wiki has limited utility for use in an unstructured knowledge base of an enterprise where multiple distributed enterprise users must have the ability to locate access and manage centrally stored information easily, and to collaborate with one another.

It is desirable to provide enhanced structure and querying capability to unstructured knowledge, such as in Semantic Wiki, to improve the ability of enterprise users, especially in a business context, to manage content, to allow use of more advanced structured searching to locate and use knowledge easily and efficiently, and to improve collaboration with other users in the enterprise. It is to these ends that the invention is directed.

DESCRIPTION OF PREFERRED EMBODIMENTS

The invention is particularly well adapted to be used with an unstructured knowledge base enhanced by Semantic Wiki, such as Semantic MediaWiki, and will be described in that context. However, as will be appreciated, this is illustrative of only one utility of the invention.

Prior to describing the invention, a brief overview description of the structure and some features of Semantic MediaWiki will be presented to permit a better understanding of the invention and the advantages it brings to such unstructured data systems. More detailed information about Semantic MediaWiki may be obtained from the Semantic MediaWiki 1.4.3 Users Manual, available from the publisher ontopris GmbH; An der RaumFabrik 29; 76227 Karlsruhe; Germany.

Semantic MediaWiki ("SMW") is an extension of MediaWiki (the application that powers the web-based encyclopedia "Wikipedia"). It provides interfaces to let users add semantic annotations to links in an article and allow a wiki to function as a collaborative database. The interfaces permit, for example, semantic annotations, searches by property, semantic searches of articles using a special query language, and semantic browsing of pages that have semantic links to a given page. SMW sets up certain tables in the wiki database, as indicated in the following Table I, that store information and data about knowledge entities, such as names, titles, characteristics, relationships, etc. The invention uses these tables, as will be described. The purposes, meanings and functions of the tables are indicated in Table I, and the more important of these tables to the invention will be described in more detail below.

TABLE I

| Table Name | Purpose |
| --- | --- |
| smw_ids | Storing page IDs, titles and namespaces (articles, properties, etc.) |
| smw_rels2 | Storing relations between pages in subjectID-propertyID-objectID form |
| smw_atts2 | Storing pages with numeric properties (attributes) and the corresponding values |
| smw_text2 | Properties with long strings as values |
| smw_spec2 | Generic built-in special properties |
| smw_subs2 | Storing subproperty and subclass (subcategory) relationships |
| smw_redi2 | Storing redirection page titles and their redirect destination IDs |
| smw_inst2 | Storing page IDs and their category IDs |
| smw_conc2 | Concept descriptions |

Figure 1:
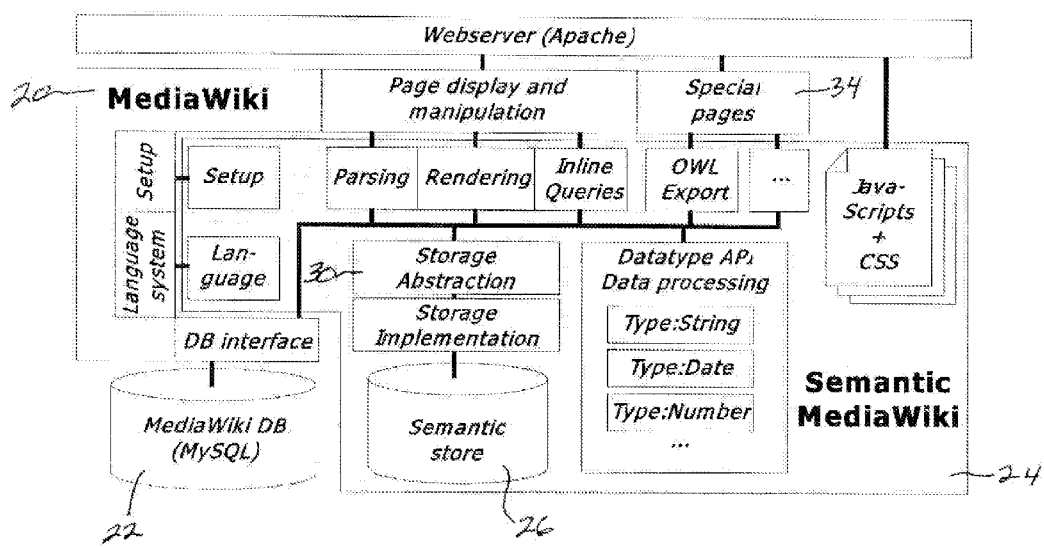
FIG. 1 is a diagrammatic block diagram of the architecture of a Semantic Wiki system of the type in which the invention may be employed.

FIG. 1 is a diagrammatic view that illustrates the overall architecture of Semantic Wiki (also referred to hereinafter as "SMW") and enhancements to conventional MediaWiki. As shown, the MediaWlki application 20 includes certain processes for accessing, displaying and manipulating pages, and includes a database (DB) 22 which stores all wiki articles and tables, for instance, the tables indicated in Table I. The SMW extension 24 (shown within the solid lines in the figure) includes a semantic store 26 and a storage abstraction layer 30. All operations on SMW are passed to the storage abstraction layer, which translates the operations into specific SQL queries. The storage abstraction layer is implemented in a process "[SMW_PATH]\includes\storage\SMW_SQLStore2.php", which implements a class "SMWSQLStore2".

Annotations of knowledge entities in Wiki articles may have, for example, the following syntax [[property::value]], where "property" is the name of a property, e.g., "Located in" and "value" is the value of that property, e.g., "China". For example, a wiki page, annotated with the "Located in" property, and with a population property and value, may state:

"Beijing is the second largest city in China [[Located in:: China]]. Its population was [[population:=17430000]] in 2007. It measures 16801.25 km².".

Semantic queries are formulated using the syntax of the annotations, and specify (i) which pages to select, and (ii) what information to display about those pages. The queries must state some conditions that describe what is asked for. Pages may be selected by name, namespace, category, and most importantly by property value. Thus, the query [[Located in::China]] is a query for all pages with the property "Located in" and a value of "China". This query will return the above page "Beijing", as well as any other pages that may exist in the database for other cities in China that have the property "Located in" and the value "China" expressed. Since the above page has also been annotated with the property "population", if one was also interested in the population of things in China, entering the additional query ?Population would result in a display of the same page titles and the values of the Population property on those pages.

However, if one were interested in finding "Cities in Asia with a population larger than 10,000,000", and entered such a query, the above Beijing page would not be returned because the query syntax does not match the annotation syntax and Semantic Wiki has no ability to infer that "China" is in "Asia". Also, no other pages would be returned unless they were annotated according to the query. In particular, if one page e.g., "Beijing" in the wiki were specifically annotated with the properties [[Category:City]] [[Located in:: China]] [[population:=17430000]] and there was another page, e.g., "China" annotated with properties of [[Category:Country]] [[Located in::Asia]], and the query used the similar syntax of the annotations e.g., [[Category:City]] [[Population::*]] [[Located in::<q>[[Category:Country]] [[Located in::Asia]] </q>]] [Population::>10,000,000]], the "Beijing" wiki page would be returned in response to the query. This illustrates one of the principal difficulties in using Semantic Wiki for a collaborative database where it is essential to be able to find and return quickly and efficiently knowledge relevant to a query. Conventional Semantic Wiki has no ability to extend queries using reasoning or to otherwise infer relations between properties or values. Therefore, unless the wiki pages are annotated with properties specific to the information sought and the relevant relations, queries for such properties or relations may return no results, even though the database may contain relevant knowledge and information.

The invention addresses the foregoing and other difficulties by enhancing the semantic querying capability of unstructured data in a knowledge base, such as Semantic Wiki, with more expressiveness by incorporating semantic reasoning logic and support. Reasoning means deriving additional implicit knowledge from the information stored in the knowledge base without the necessity of queries expressly seeking the additional knowledge. This may be accomplished by incorporating predefined or user-defined rules and logic in the knowledge base that process search queries to infer relations among the knowledge entities in the knowledge base in order to locate relevant information. In particular, the invention in one aspect extends the semantic querying module of Semantic MediaWlki with a reasoning engine to include semantic reasoning capability based upon transitive relations, symmetric relations, and inverse relations inferences. This is accomplished by adding semantic reasoning to "search by property" and "semantic search" queries. The invention, as will be described, locates and collects semantic data by permitting users to annotate knowledge entities with a special markup property that includes reasoning support, and by incorporating reasoning logic for special queries. These queries are input through the Special Pages interface 34 of FIG. 1, parsed by the second layer 36, and processed by the storage layer 30 to find and return relevant content.

In the interface "search by property" of SMW, users enter a property name and target value, and the search returns a list of all pages that have that property with that value. Given the property title and the value title, it remains to find the corresponding subjects. Use is made of the tables in Table I. The first and second tables smw_ids and smw_rels2 indicated in Table I in particular are enhanced and used by the invention. The first table smw_ids stores all page IDs, titles, namespaces, articles, properties, etc. The second table smw_rels2 stores all relations between pages, properties and objects. For instance, all properties and values are stored in this second table. Each property has a page that identifies the property by "type", and stores relations between pages, other properties, objects and values. For example, when the page "Beijing" is annotated with the property and value [[Located in:: China]], a record is inserted into the second table smw_rels2 giving the page ID, property ID, and value ID. If other wiki pages, e.g., "Shanghai" and "Hong Kong", are also annotated with this property [[Located in:: China]], records are also written into the second table for these page IDs that indicate the relation connecting the pages by the Located in property. Thus, once the property ID and the value ID are located in table smw_ids, the subject IDs can be found by specifying the property ID and value ID in the table smw_rels2. Finally, the subject titles may be found in table smw_ids. If the value is a number, which means the property is an attribute, the relation is stored in another table smw_atts2. But since it is unnecessary to do reasoning on attributes, this can be ignored.

To find subjects by specifying a property and a value, the function "getPropertySubjects" of class SMWSQLStore2 is employed. The invention adds reasoning capacity to "search by property" by extending the function "getPropertySubjects" as will be described below.

"Semantic search" allows users do more advanced searching by using an easy-to-use query language. The syntax of this query language is similar to the syntax of annotations, as previously described. The process of semantic requires that the query string will go through two compilations. The first compilation is performed by SMWQueryParser::getQueryDescription (implemented in [SMW_PATH]\includes\SMW_QueryProcessor.php) and the compiled result is encapsulated in class SMWQuery. The second compilation takes the result of the first compilation as an input, and outputs a query tree that is stored in an array.

For example to find "all the persons that work for a company which is located in China, and who studied at a school that is located in a place which has a building called Jin Mao", the query may be:

[[works for. located in::China]] [[studied at. located in. has building::Jin Mao]]

Figure 2:
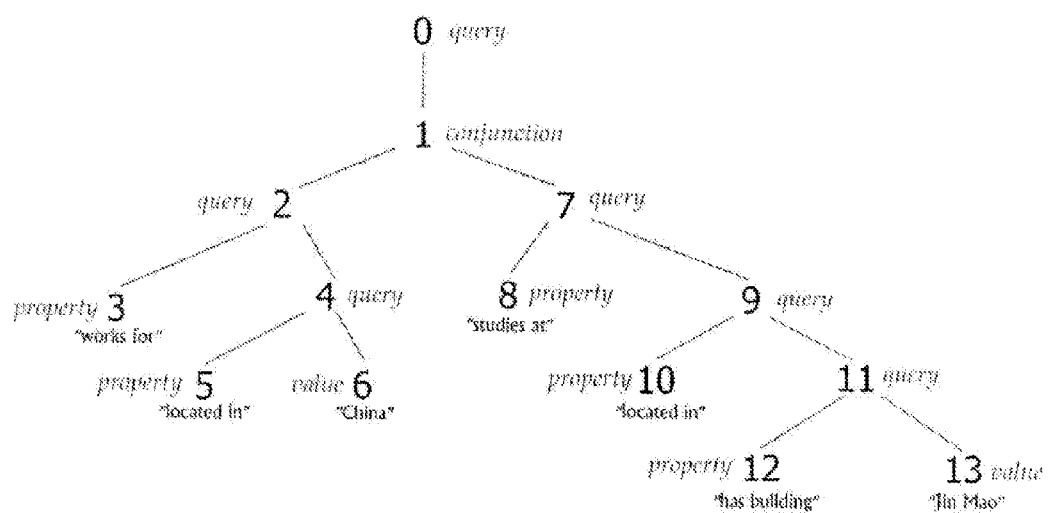
FIG. 2 is a diagrammatic view of an example of a query tree.

FIG. 2 illustrates the corresponding query tree for this example. There are five types of nodes in the query tree. These are: a query node (nodes 2, 4, 7, 9 and 11); a conjunction node ("AND" in natural language (node 1)); a disjunction node ("OR" in natural language, not present in FIG. 2); a property/category node (nodes 3, 5, 8, 10, and 12); and a value node (nodes 6 and 13).

Each node is an instance of class SMWSQLStore2Query (defined in [SMW_PATH]\includes\storage\SMW_SQLStore2_Queries.php), and the member variable type of this class indicates the type of the node, and variable components point to the child nodes of the node. All nodes are stored in an array. The numbers in FIG. 2 indicate their positions in the array.

The execution of a query tree is performed by SMWSQLStore2QueryEngine::executeQueries (also defined in SMW_SQLStore2_Queries.php). The function takes the root node as the input, and traverses the tree in post order (reverse). It computes SQL query conditions for each node (including FROM, WHERE, etc). When it finishes traversing node 4 and all of its child nodes in FIG. 2, it knows it needs to make an SQL query on the table smw_rels2, where p_id=ID of the property "located in" and o_id=ID of the value "China" are found. Each node may have some member variables to store these temporary results. When the query process finishes traversing the whole tree, all the conditions needed to obtain the answer set corresponding to the query are known. These conditions may be then all combined together in a single SQL query which is executed to get the answers.

Before describing in more detail the enhanced reasoning extensions provided by the invention, several concepts will first be defined. Reasoning is implemented by a "special property", meaning that the property may indicate a transitive relation, or a symmetric relation, or at least one inverse relation, as will be described. A "normal property" is defined as a property that is not "special". An "extended search" is a search that is extended by reasoning on a result set. And the "specialties of a special property" are whether the special property comprises a transitive, symmetric or inverse of type relation.

The invention may implement Transitive, Symmetric and InverseOf relations using A-box logic and rules-based reasoning algorithms. For a property p or q and values x, y and z, the relations are:

$$\text{Transitive Property}(p) \text{ means}(xpy),(ypz) :- (xpz)$$

$$\text{SymmetricProperty}(p) \text{ means}(xpy) :- (ypx)$$

$$\text{InverseOf}(p,q) \text{ means}(xpy) :- (yqx)$$

Stated differently, a transitive relation p means that whenever an element x of a set is related to an element y of the set, and y in turn is related to an element z, then x is also related to z. A symmetric relation p means that if all x in a set is related to y, then all y is related to x. If elements x and y have a relation p such that given x, p produces y, q is an inverseof relation p if given y, q produces x.

The approach taken by the invention for executing a search request (query) is to first find a "subject" by specifying the "property" and an "object". It is first determined whether the property is special or not by looking at the property "type" on the property's page in the second table of Table I. If the property does not have type "special", it is normal and there is no need to do reasoning, meaning that an extended search is unnecessary. Accordingly, the initial query results are first searched, and then extended if the property is "special" to incorporate reasoning. This may be implemented by modifying the functions "getPropertySubjects" and "executeQueries" which are core functions of "search by property" and "semantic search", respectively. Since both getPropertySubjects and executeQueries need reasoning ability, the reasoning function can be independent from the two so that it can be called by both.

The function that determines whether a property is special is termed "is SpecialProperty", and the function that implements an extended search is termed "doReasoning". Both may be implemented in [SMW_PATH]\includes\storage\SMW_SQLStore2.php as member functions of class SMW_SQLStore2.

The is Specialproperty function may be defined as:

function isSpecialProperty($pid)

The function takes the property ID ($pid) as an input, determines whether the property is special by checking its "type", i.e., to determine whether it has a transitive type or symmetric type or whether it has inverse properties. The output of the function is an array that indicates what types of specialty (transitive, symmetric, or inverse_of) the property has. If the property has inverse properties, the IDs of the inverse properties are also included in the array. If it is not a special property, then the output array is an empty array.

The doReasoning function may be defined as:

function doReasoning($pid,$oids,$specs,&$resultids)

The function takes four parameters as inputs, i.e., a property ID ($pid); Object IDs ($oids) which are stored in an array; a specialty array ($specs) which is the output array of the function is SpecialProperty; and an array ($resultids) to store the results of the extended search.

Each of the three cases of a specialty, i.e., Symmetric, Transitive, and InverseOf, has a different set of conditions that are used in queries, and each is treated differently to find the extended results. They are treated as follows:

Symmetric: For p_id=the property ID, and s_id=the object IDs, find the corresponding o_id in table smw_rels2 as the extended answer.

Transitive: For p_id=the property ID, and o_id=the object IDs, find the corresponding s_id in table smw_rels2; add them to the answer set; and let o_id=the new answer; repeat the foregoing step until no new answers can be found.

InverseOf: For p_id=the inverse property ID, and s_id=the object IDs, find the corresponding o_id in table smw_rels2 as the extended answers.

The function getPropertySubjects has four parameters, i.e., property, value, request, and options. First a check is performed to determine if the property is a special property. If so, an extended search is performed, as indicated above, to obtain the extended answers.

Before executing the function executeQueries, the whole query tree is first scanned to find all special properties. If a property is special, then its parent "query" node is treated as a new type of node which is called a "special query node". After scanning the whole tree, the process begins executing the function executeQueries, which take as an input the root of the query tree. Generally, an extended executeQueries is the same as the original function. The only difference is when it comes across a special query node; then, it must compute the extended answers of the query immediately, and store the answers in a temporary table. The table name and table field may be stored in selected member variables of the query node, so that they may be added to the conditions of the final SQL query string when it finishes traversing the whole query tree.

Thus, the invention enables queries that are not literal matches to the annotations to return relevant results by incorporating reasoning relations into properties. This permits queries employing inferences and reasoning to find and return relevant results that otherwise might not have been returned.

The invention has particular utility in a business enterprise environment for implementing a collaborative knowledge management system that permits enterprise-wide collaboration and management of content, while affording improved interfaces for enhanced searching and navigation. By incorporating Semantic Wiki technology and enhanced querying structure for finding and using information into an existing unstructured enterprise knowledge base, the invention converts the knowledge base into one that enables users to collaborate, share and access knowledge quickly and easily using browser technologies. This affords a unified knowledge content repository that enables users in a business enterprise to collaborate, discuss, and share information in such different areas including, but not limited to, product design and development, manufacturing and supply chain management, sales and marketing, finance, human resources, and enterprise operations. Moreover, the invention enables users to search across different wiki sites or other collaborative applications running on the enterprise network while applying consistent and transparent management of records and digital rights, integration of business processes, full audit trails, archiving and backup, and security.

While the foregoing description has been with respect to specific embodiments of the invention, it will be appreciated by those skilled in the art that changes may be made to these embodiments without departing from the principles and spirit of the invention, the scope of which is defined by the appended claims.

The invention claimed is:

1. A method of query enhancement in an unstructured knowledge base, comprising:
   annotating a selected knowledge entity in the unstructured knowledge base with one or more annotations having semantic reasoning supports that infer relations between said selected knowledge entity and other knowledge entities in the knowledge base, each said annotation comprising a property and a corresponding value for said property, the property having a property identifier that identifies said property and the value having a value identifier that identifies said corresponding value; and
   searching said knowledge base with a search query that uses at least one of said annotations having semantic reasoning supports and reasoning logic to infer relations between knowledge entities in said knowledge base to locate information relevant to the search that is not expressly stated in the search query.

2. The method of claim 1 wherein said semantic reasoning supports comprise logic that processes search queries by inferring relations between said selected knowledge entity and said other knowledge entities using said property and value identifiers to locate said relevant information.

3. The method of claim 1, wherein said semantic reasoning supports comprise special properties that infer one of a transitive, a symmetric or an inverseof relation between said knowledge entities.

4. The method of claim 1, wherein said annotating comprises associating with a knowledge entity in said knowledge base said annotation comprising said property and said corresponding value of such property using a predefined syntax for said annotation, and said searching comprises constructing said search query to have a corresponding syntax.

5. The method of claim 1, wherein said semantic reasoning supports comprise said property being one or more of a plurality of special properties that infer different types of predetermined relations between related knowledge entities in said knowledge base, and said searching comprises executing an initial search using said search query, and executing an extended search on the results of the initial search using semantic reasoning logic upon determining said results to include a special property.

6. The method of claim 5, wherein said search query defines a query tree having different types of nodes corresponding to knowledge entities, and said initial search comprises traversing said tree to identify nodes corresponding to said special properties, obtaining definitions of a relation for each node identified as a special property node, and executing said extended search for each identified node with an SQL query using said definition for said relation to obtain said relevant information.

7. The method of claim 1, wherein said knowledge base comprises an unstructured unified database of an enterprise, and the method further comprises enhancing said database with Semantic Wiki to support semantic searching.

8. The method of claim 7, wherein said knowledge entities are stored on wiki pages of said database, and said annotating comprises associating page identifiers of wiki pages with said property identifiers and corresponding value identifiers, and wherein said semantic reasoning supports comprise logic that processes search requests employing a property name and a target value using said relations to locate said relevant information.

9. The method of claim 8, wherein each of said wiki pages has a unique page identifier, and said database has a table that lists the page identifier of each wiki page on which a knowledge entity annotated with a particular property identifier and a particular corresponding value identifier is located, and wherein said searching comprises searching said table with said search query.

10. A method of query enhancement of a Semantic Wiki unstructured knowledge base, comprising:
   annotating selected knowledge entities in said unstructured knowledge base with annotations comprising special reasoning properties that infer relations between said selected knowledge entities and other knowledge entities in the knowledge base; and
   searching said knowledge base with a search query that uses said special reasoning properties to locate information relevant to the search that is not expressly stated in the search query, said searching comprising executing an initial search using said search query to locate knowledge entities annotated with said special reasoning properties, and executing an extended search using the results of said initial search and reasoning logic to perform semantic reasoning based upon the properties of the located knowledge entities to identify related knowledge entities.

11. The method of claim 10, wherein said Semantic Wiki knowledge base stores knowledge on wiki pages, and the method further comprises storing a separate page in said knowledge base for each such special reasoning property, said separate page defining a relation between property values annotated with said special reasoning property and other property values, and said searching comprising identifying wiki pages that contain knowledge entities having such special reasoning property.

12. The method of claim 11, wherein said searching comprises formulating a search query containing properties and values relevant to desired information, parsing the search query into different types of properties and values, identifying properties that are special reasoning properties, and separately searching for said relevant knowledge using the relations defined by such special reasoning properties.

13. A knowledge base storing unstructured data, comprising:
   a non-transitory storage device for storing a plurality of separate unstructured knowledge entities in said knowledge base, the knowledge entities each having been annotated with associated properties and corresponding values to enable a semantic search of said knowledge base, certain of said properties being of one or more types of special properties that infer relations between knowledge entities; and
   a reasoning engine that processes a search query on said knowledge base using said inferred relations and semantic reasoning logic to locate knowledge entities providing relevant information that is inferred from but not expressly stated in the search query.

14. The knowledge base of claim 13, wherein said knowledge base is a unified content repository of an enterprise that stores unstructured enterprise data.

15. The knowledge base of claim 14, wherein said knowledge base incorporates Semantic Wiki technology to store knowledge entities on wiki pages that are identified by the relations as containing said relevant information.

* * * * *